(12) United States Patent
Kaskawitz et al.

(10) Patent No.: US 7,543,430 B2
(45) Date of Patent: Jun. 9, 2009

(54) BUTTON TYPE BLADE BRAKE CLUTCH CONTROL

(75) Inventors: Scott Kaskawitz, Burlington, NC (US); Brian Bender, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/852,720

(22) Filed: Sep. 10, 2007

(65) Prior Publication Data

US 2009/0064649 A1 Mar. 12, 2009

(51) Int. Cl.
*A01D 69/10* (2006.01)
(52) U.S. Cl. .................................................. 56/11.3
(58) Field of Classification Search ............... 56/11.3, 56/10.8, 10.5, 11.5, 10.1; 180/19.3
See application file for complete search history.

(56) References Cited

U.S. PATENT DOCUMENTS

| | | | |
|---|---|---|---|
| 4,309,862 A | | 1/1982 | Carlson |
| 4,413,466 A | | 11/1983 | Beugelsdyk et al. |
| 4,430,848 A | | 2/1984 | Wistrom |
| 4,503,958 A | | 3/1985 | Nishio |
| 4,667,459 A | * | 5/1987 | Scanland et al. ............ 56/11.3 |
| 4,850,182 A | | 7/1989 | Barnard et al. |
| 4,930,369 A | | 6/1990 | Barnard et al. |
| 5,033,595 A | | 7/1991 | Pardee |
| 5,146,735 A | * | 9/1992 | McDonner ................ 56/11.3 |
| 5,203,147 A | * | 4/1993 | Long ....................... 56/10.1 |
| 5,279,101 A | * | 1/1994 | Sueshige .................. 56/11.5 |
| 5,806,374 A | * | 9/1998 | Mizutani et al. ........ 74/483 PB |

(Continued)

FOREIGN PATENT DOCUMENTS

| EP | 0 981 945 A2 | 3/2000 |
|---|---|---|
| EP | 1 616 472 A1 | 1/2006 |
| EP | 1 702 504 A1 | 9/2006 |

OTHER PUBLICATIONS

European Patent Office Search Report and Annex to the European Search Report dated Dec. 4, 2008 for corresponding European Patent No. 08 015 649.0.

(Continued)

*Primary Examiner*—Árpád Fábián-Kovács
(74) *Attorney, Agent, or Firm*—Jenkins, Wilson, Taylor & Hunt, P.A.

(57) ABSTRACT

Button type blade brake controls are disclosed that can be disposed on a handle of a power machine such a lawnmower. A blade brake clutch control can include a housing having a top portion that has a front side and a rear side. A control bail can have a pin extending therefrom that extends into the housing. A pivot arm can be disposed within the housing and connected to a control cable. A rotatable latch can be secured to the pivot arm. The latch can have a latch head that is aligned with the pin extending from the control bail. A rearward button can be disposed on the rear side of the top portion of the housing. The rearward button can have a contact surface positioned above the latch head. The rear button can be configured for pushing downward so that the contact surface contacts the latch head to rotate the latch head into an engaged position about the pin of the control bail so that, as the control bail is pulled downward, the pivot arm also pivots downward to pulled the control cable forward.

15 Claims, 7 Drawing Sheets

U.S. PATENT DOCUMENTS

| | | | |
|---|---|---|---|
| 6,220,005 B1 * | 4/2001 | Plamper et al. | 56/10.8 |
| 6,658,829 B2 * | 12/2003 | Kobayashi et al. | 56/10.5 |
| 6,751,936 B2 * | 6/2004 | Kucera et al. | 56/10.8 |
| 2002/0153179 A1 * | 10/2002 | Kobayashi et al. | 180/19.3 |
| 2007/0101690 A1 | 5/2007 | Stover et al. | |

OTHER PUBLICATIONS

First Office Action from European Patent Office for EP Application No. 08 015 649.0 dated Jan. 16, 2009.

* cited by examiner

BUTTON TYPE BLADE BRAKE CLUTCH CONTROL

TECHNICAL FIELD

The subject matter described herein relates generally to blade brake clutch controls. In particular, the subject matter described herein relates to button blade brake clutch controls for a lawnmower that can reside on a portion of the handle near the location where the operator places his hands to operate the lawnmower.

BACKGROUND

Power machines, particularly walk-behind power machines, often employ an operator control handle or bail to actively control a component of the power machine. In addition to providing a means of controlling the power machine, the bail is often employed to enforce operator presence for safety reasons. For example, it is a requirement for walk-behind power mowing machines to have a "dead man" control or operator presence control, which generally includes a spring-biased bail which can be grasped by the operator during normal operation of the machine to enable the motor of the machine. If the bail is thereafter released, the machine action is rapidly terminated for reasons of safety. In the case of a "dead man" control on a lawnmower, the engine and the rotating blade are both rapidly stopped when the operator releases the bail.

More recently, blade brake clutch control apparatuses have been employed to enforce operator presence while using lawnmowers. A blade brake clutch control allows the rotating cutting blade to be stopped and engine to remain enabled when the operator releases the bail controlling the blade brake clutch. In a blade brake clutch mower equipped with an internal combustion engine, the engine can be started in a generally conventional manner, using either a rope pull or an electric starter. Once the engine is started, the engine remains running during the operation of the lawnmower unless the engine is purposely shut off by the operator. When the bail is moved to the engaged position, the blade brake clutch control activates the clutch whereby the cutting blade is engaged. Once the operator releases the control bail, a clutch between the blade and the output shaft of the engine is released and a blade brake is engaged. Thus, even though the engine continues to run, the blade comes to a stop. This action prevents the blade from freely spinning to a stop, in which an injury could occur to the user while the blade slows from an extremely high velocity of rotation.

The blade brake clutch control action can be contrasted with a dead man control mower in which the blade comes to a stop once the control bail is released since the engine is killed, i.e., engine ignition is disrupted. Nonetheless, the result is the same in both cases, namely the blade comes to a stop when the operator releases the control bail.

It is a safety requirement that bails on walk-behind lawnmowers designed for enforcing operator presence comprise a two-step apparatus such that a user must perform a two-step process before the blade can be engaged for rotation. Thus, a two-step bail apparatus for a lawnmower would provide for operator control of the mowing machine as well as conform to safety regulations. In a blade brake clutch mower, however, the control bail must operate differently than in a dead man control mower due to this need for two separate operator actions to reengage operation of the blade.

The control system used in a blade brake clutch mower to start and stop the rotation of the blade is necessarily more complex than that in a dead man control mower. Generally speaking, such a blade brake clutch control system is not as intuitively obvious to use as that for a dead man control mower. Accordingly, there is a need for a blade brake clutch control system that is simple and relatively easy to understand and use.

SUMMARY

According to the present disclosure, novel button type blade brake clutch controls and methods are provided for controlling a power machine, such as a mowing machine.

It is therefore an object of the present disclosure to provide novel apparatuses and methods for controlling a blade brake clutch of a mowing machine or other power machine via a blade brake clutch control that uses easily recognizable steps that are easy and comfortable for the operator to perform. An object having been stated hereinabove, and which is achieved in whole or in part by the subject matter disclosed herein, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

As used herein, "nominal angle" refers to the theoretical angle that most closely aligns with a surface as measured from a base line taking into account whether the surface is curved or of a non-linear shape. For example, for a curved surface, the nominal angle can be from a tangential line that passes through an operation point on the surface and extends to the base line.

Figure 1:
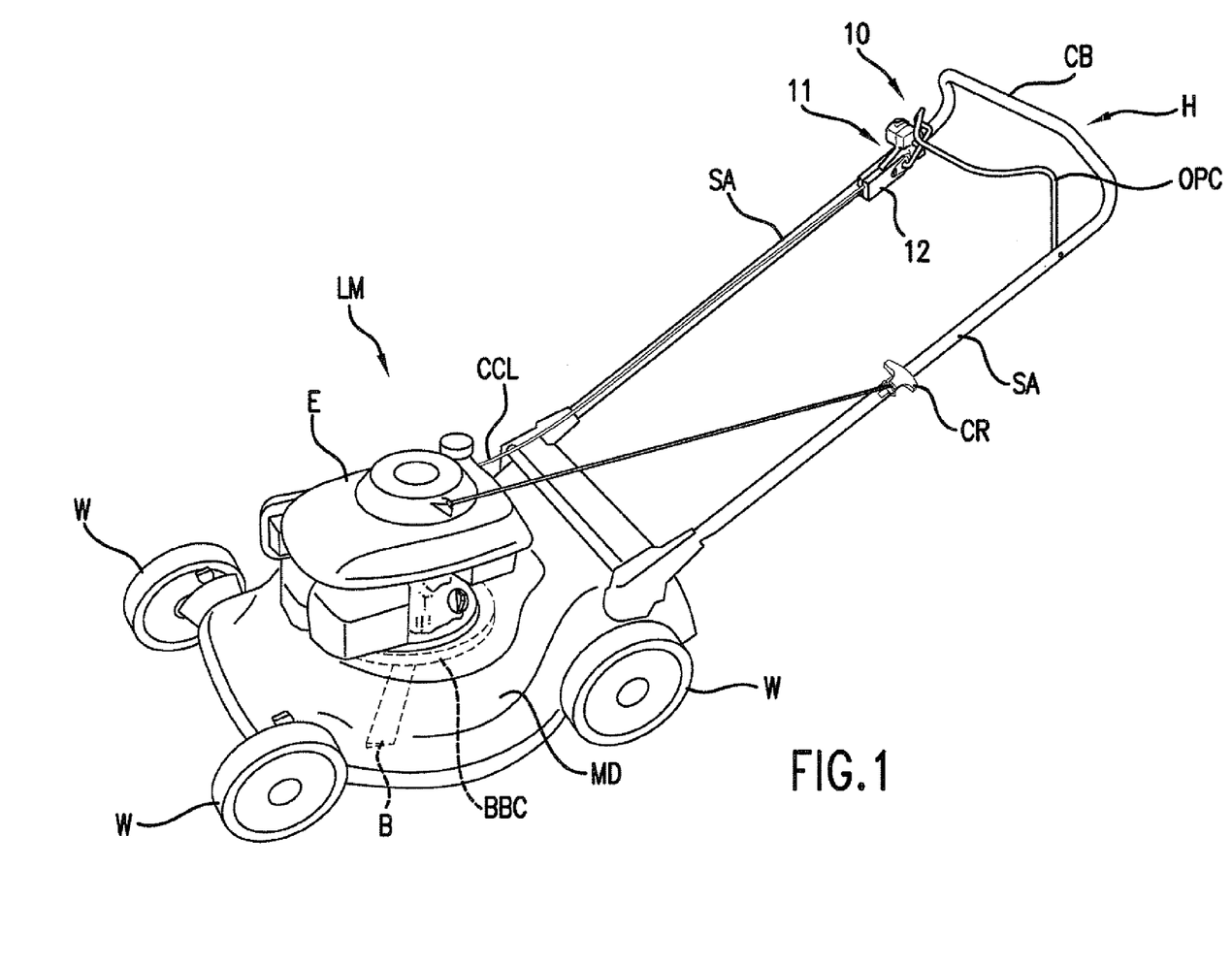
FIG. 1 illustrates a perspective view of an embodiment of a power machine that includes an embodiment of a blade brake clutch control according to the present subject matter.

FIG. 1 illustrates a perspective view of a walk-behind power machine in the form of a lawnmower LM. Lawnmower LM can be a push mower or a self-propelled mower which is propelled in forward or reverse by one or more wheels such as wheels W that can be driven. Lawnmower LM includes an engine E that can reside atop a mower deck MD of lawnmower LM or can be in any other suitable position such as off-set from mower deck MD. Engine E drives a blade B under mower deck MD to cut the grass or lawn over which lawnmower LM is pushed. Engine E rotates mower blade B at a high speed in order to effectively cut the grass in which the blade B encounters. Due to safety concerns, blade B has a blade brake clutch BBC attached thereto that can engage a clutch to rotate blade B or apply a brake to blade B to stop it from rotating. Blade brake clutch BBC can release the clutch and brake blade B for such times as when the operator has walked away from the lawnmower so that the unattended lawnmower's engine can still run. However, blade B will stop turning to prevent any unnecessary safety hazards associated with a rotating blade B.

Lawnmower LM further includes a handle generally designated H which can include side arms SA that can extend upward from the mower deck MD of lawnmower LM. Handle H can further include a cross bar CB that can connect the side arms SA to form a generally U-shaped handle H. As shown in the figures, handle H can be ergonomically designed to better fit the operator's normal ergonomic position of the hands during use of lawnmower LM.

An operator presence control, in the form of a blade brake clutch control generally designated 10, can include an operator presence control bail OPC. Control bail OPC can be secured to handle H near cross bar CB so that the operator can engage control bail OPC when operating lawnmower LM. Such operator presence controls are mandatory under federal regulations to increase the safety of walk-behind power lawnmowers. In the embodiment shown in FIG. 1, control bail OPC can be pulled from its upright position toward cross bar CB of handle H to facilitate the engagement of blade brake clutch BBC to engage the clutch and release the brake to allow rotation of blade B.

To further increase safety during operation of lawnmower LM, blade brake clutch control 10 can include a second step that can be required to engage the clutch and release the brake of blade brake clutch BBC to permit rotation of blade B during operation of lawnmower LM. For example, blade brake clutch control 10 can include a brake clutch control apparatus generally designated 11 that can work in tandem with control bail OPC to require a two-step process before engaging the clutch and releasing the brake of blade brake clutch BBC to permit rotation of blade B. Brake clutch control apparatus 11 can include a housing 12, and a clutch control line CCL can extend from blade brake clutch BBC that engages blade B into housing 12. Brake clutch control apparatus 11 can include a rearward button 14 (shown in the figures other than FIG. 1) disposed in housing 12 that must be activated before control bail OPC can pull clutch control line CCL forward to engage the clutch and release the brake of blade brake clutch BBC to permit rotation of blade B of lawnmower LM. Operation of the blade brake clutch control 10 will be explained in further detail with reference to FIGS. 2 and 3.

Figure 2:
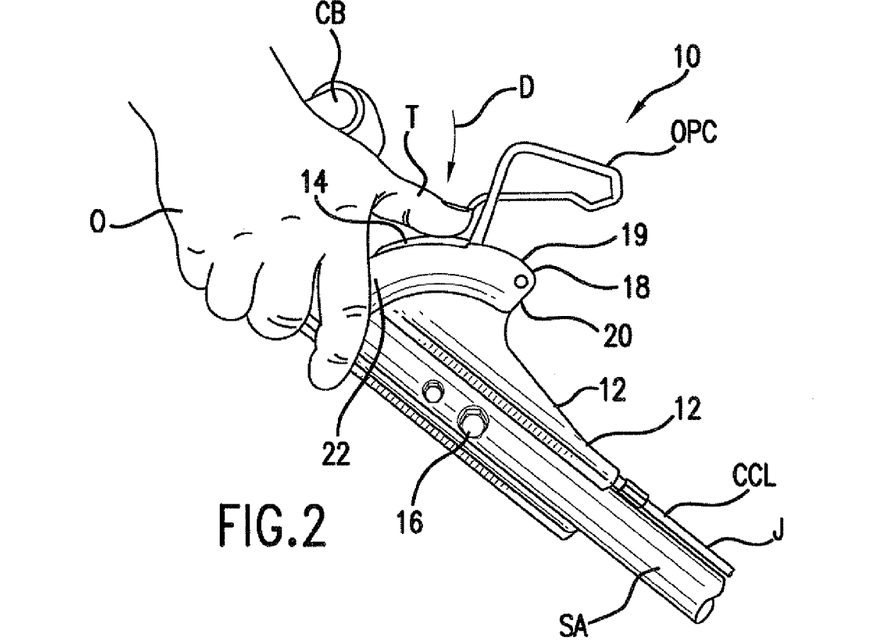
FIG. 2 illustrates a side view of the embodiment of the blade brake clutch control according to FIG. 1 with an operator activating a first step of the blade brake clutch control.
Figure 3:
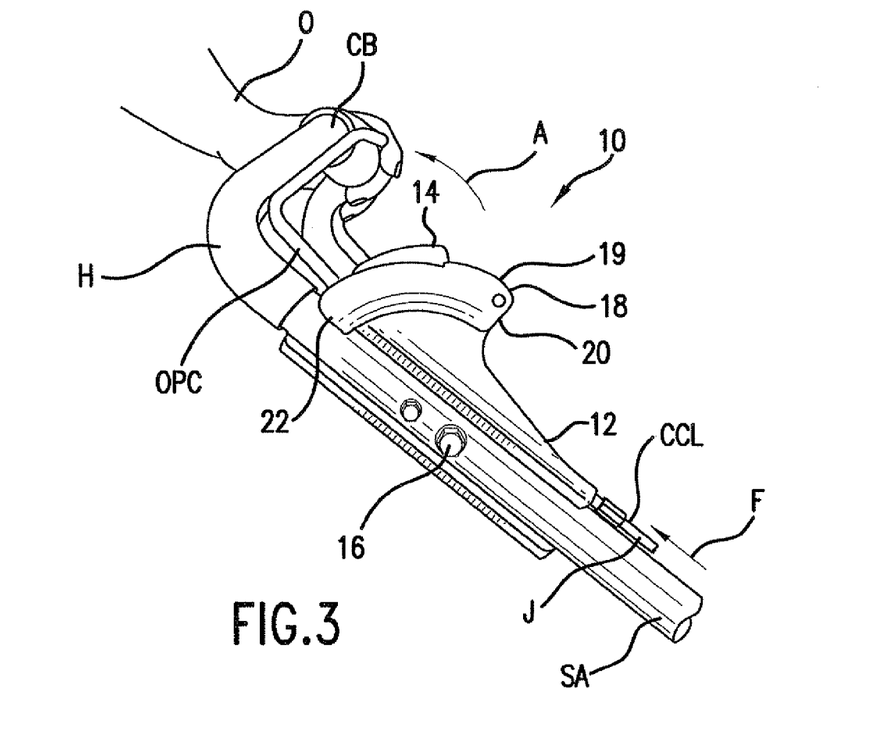
FIG. 3 illustrates a side view of the embodiment of the blade brake clutch control according to FIG. 1 with an operator activating a second step of the blade brake clutch control.

Once an operator has started engine E of lawnmower LM, for example by using a crank pulley CR as shown in FIG. 1, the operator can then use blade brake clutch control 10 to activate blade brake clutch BBC as shown in FIGS. 2 and 3. Once the engine has started, the operator, while standing in position to operate lawnmower LM, can push rearward button 14 in housing 12 and then pull control bail OPC downward, rotating it toward cross bar CB of handle H in direction of arrow A of FIG. 3.

Brake clutch control apparatus 11 as mentioned above can include housing 12 and rearward button 14. Housing 12 can be secured to side arm SA of handle H in any conventional manner, for example, by a nut and bolt combination 16. Housing 12 can include a top portion 18 which can have a peak 19. Top portion 18 can have a front side 20 and a rear side 22. Rear side 22 can be closest to the cross bar of handle H and can be sloped downward from peak 19 of top portion 18 toward cross bar CB of handle H. The slope of rear side 22 can extend in a direction opposite to the direction at which handle H (side arms SA) is angled downward to mower deck MD (see FIG. 1). The slope of rear side 22 can be curved in a convex or a concave manner or can be in a straight slope. The nominal angle of the slope can vary. For example, the slope can have a nominal angle of between about 15° and about 85° as measured from the side arm SA of handle H.

Rearward button 14 can be positioned on rear side 22 of housing 12. Since rear side 22 can be sloped downward toward handle H, rearward button 14 can be positioned at an angle to handle H. Rearward button 14 can be angled in a direction opposite to the direction at which handle H (side arms SA) is angled downward to mower deck MD (see FIG. 1). The angled rearward button 14 provides easy accessibility from cross bar CB of handle H for operator O. For example, as shown in FIG. 2, operator O can push downward with thumb T in a direction D against rearward button 14 which extends outward from housing 12 from a position proximal to the normal placement of operator O's hand on crossbar CB during operation of lawnmower LM. At this point, operator O can pull control bail OPC in direction A of FIG. 3. Since the rearward button 14 has been pushed, the cable within clutch control line CCL is engaged with control bail OPC. In this manner, as control bail OPC is pulled downward by the operator O in a direction A, the cable within jacket J of clutch control line CCL moves forward in a direction F. Thereby, blade brake clutch control 10 activates blade brake clutch BBC causing it to engage the clutch and release the brake to permit blade B of lawnmower LM to rotate.

The rearward and angled placement of button 14 in brake clutch control apparatus 11 provides an ergonomic and easily recognizable step in the two-step operator presence control of blade brake clutch control 10. The nominal angle of rearward button 14 can vary. For example, rearward button 14 can be positioned at a nominal angle within housing 12 as measured from the downward extending side arm SA of handle H from about 15° to about 85°. For instance, the nominal angle of rearward button 14 can be between about 30° and 60°. Of course, the nominal angle of rearward button 14 can depend on the slope of rear side 22 of top portion 18 of housing 12. The nominal angle of rearward button 14 can be substantially equal to the nominal angle of the slope of rear side 22. In the alternative, the nominal angle of rearward button 14 can be different from the nominal angle of the slope of rear side 22. For example, the nominal angle of rearward button 14 can be slightly offset (meaning slightly larger or smaller) than the nominal angle of rear side 22. The nominal angles of both rearward button 14 and sloped rear side 22 will be explained in more detail below.

Figure 4:
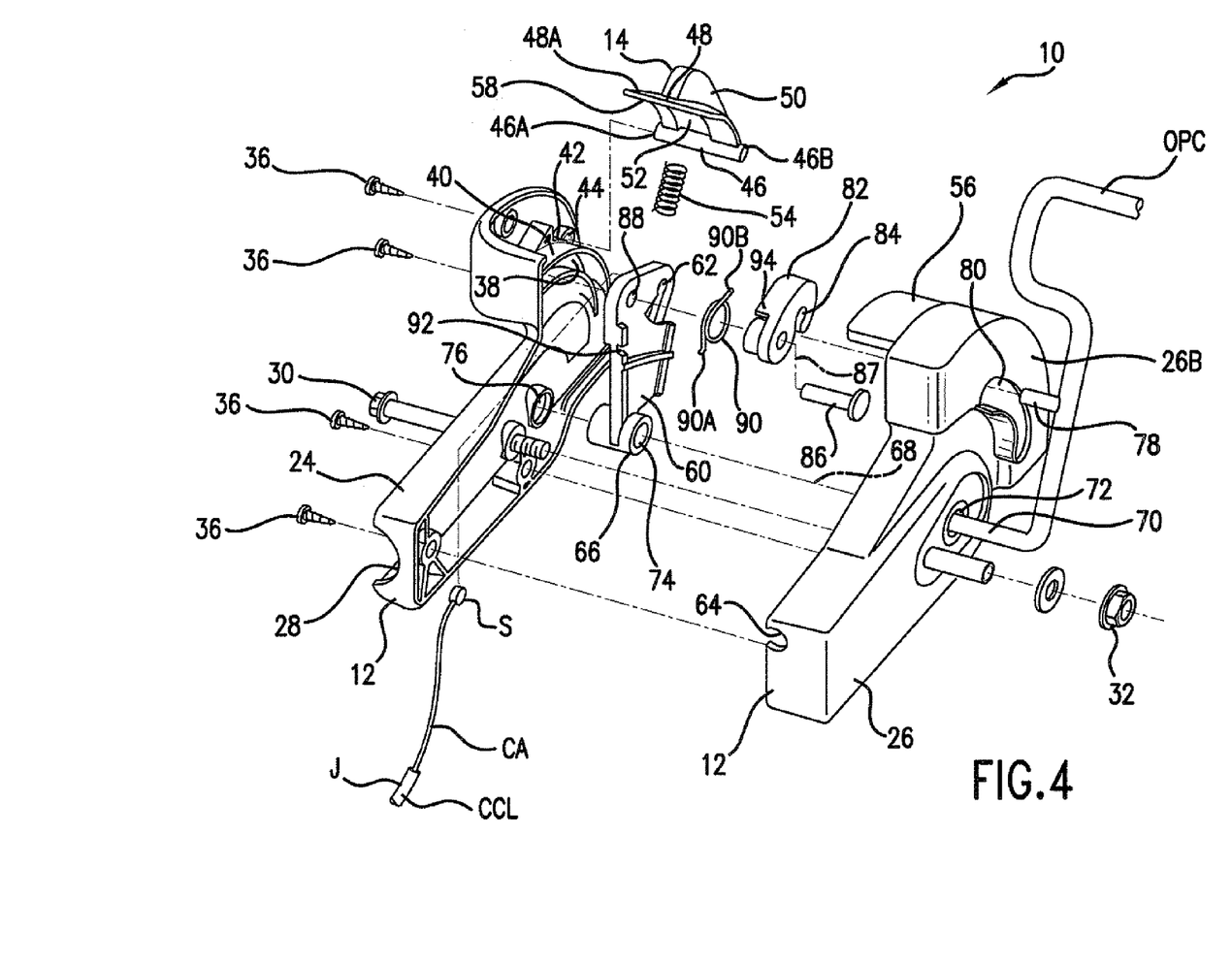
FIG. 4 illustrates an exploded view of an embodiment of the blade brake clutch control according to FIG. 1.

Referring now to FIG. 4, an exploded view of blade brake clutch control 10 is shown. Housing 12 can be constructed of two housing halves 24, 26. Housing half 24 can include a handle recess 28 that can extend along housing half 24. Handle recess 28 can be shaped so as to conform around and snugly fit onto side arm SA of handle H (see FIGS. 1-3). Once housing half 24 and housing half 26 are secured together, housing 12 can be placed on side arm SA of handle H. A bolt 30 and a nut 32 of a nut and bolt combination can be used to secure housing 12 to side arm SA of handle H. Bolt 30 can be placed through side arm SA and align so as to pass through housing 12 as shown in FIG. 4 with a nut 32 being screwed onto bolt 30 on the opposite side of housing half 26. In this manner, housing 12 can be secured to handle H. Other securement methods can also be used to secure housing 12 to handle H of lawnmower LM. For example, adhesives, screws, snap fastening devices, key and keyway devices, and the like can be used. Further, housing half 24 can be integral to handle H.

Brake clutch control apparatus 11 can be secured to either or both side arms SA of handle H through simple design modifications. Further, while housing 12 is described as comprising two halves herein, it should be noted that housing 12 can comprise multiple component parts.

Housing halves 24, 26 can be secured together through securement elements 36 after or during assembly of blade brake clutch control 10. Again, securement elements 36 can be any number of securing devices such as screws, bolts and nuts, adhesives, point bonding, or the like. The securing of housing halves 24, 26 of housing 12 can aid in the securement of the other components of blade brake clutch control 10. When housing halves 24, 26 are secured together housing 12 can form an aperture through which rearward button 14 protrudes from sloped rear side 22.

Housing half 24 can include a guidance groove 38 at its rear portion which defines a ridge 40 on which a platform 42 resides. Guidance groove 38 and ridge 40 can be sloped with platform 42 being angled. At the rear and to the side of ridge 40, housing half 24 can form a pivot recess 44. Similarly, housing half 26 can also include a pivot recess (not shown) which aligns with pivot recess 44. Button 14 can include a pivot bar 46 that has ends 46A, 46B that extend outward from rearward button 14, for example, from a shelf 48. Ends 46A, 46B fit into the pivot recesses 44 of housing halves 24, 26, respectively. Once housing halves 24, 26 are secured together with rearward button 14 in place, a rise 50 of rearward button 14 protrudes outward from housing 12 so as to be easily recognizable as a portion for the user or operator to push during operation of blade brake clutch control 10.

Rise 50 of button 14 can include a recess 52 therein. A button spring 54 can be received within recess 52 and can reside against platform 42 of ridge 40 within housing half 24. Button spring 54 can be used to secure alignment of button 14 so that rise 50 protrudes outward from housing 12 once housing halves 24, 26 are secured together. Button spring 54 provides a resiliency that allows button 14 to extend outward from housing halves 24, 26 even after depression by the operator during use. Platform 42 can include a post which extends a limited distance outward around which button spring 54 in the form of a coil spring can be placed to secure placement of button spring 54 for proper alignment within recess 52 of button 14. Other spring mechanisms beside the coil spring, such as a leaf spring, a volute spring, a Belleville spring, resilient material, or the like can be used as button spring 54. Since the platform 42 can be angled, the nominal angle of the platform and the nominal angle of rearward button 14 can correspond to create an appropriate positioning of button spring 54.

As stated above, rearward button 14 can include a shelf 48. Shelf 48 can reside along any side of rearward button 14. For example, shelf 48 can be disposed around the front portion of rearward button 14 or disposed around a side portion of rearward button 14. Alternatively, shelf 48 can extend along three sides of button 14 and abut against pivot bar 46. Shelf 48 can reside under ledges 56 of housing 12 so as to provide an abutment for the button 14 to prevent button 14 from pivoting outward from housing 12. Shelf 48 can include a latch contact portion 48A that can provide a contact surface 58 on the underside of button 14. Contact surface 58 can be used to engage cable CA of control line CCL with control bail OPC when rearward button 14 is pushed as will be explained in more detail below. Latch contact portion 48A can be anywhere on shelf 48 that allows a contact surface 58 to engage cable CA of control line CCL with control bail OPC when rearward button 14 is pushed. Further, latch contact portion 48A can be on the underside of rearward button 14 if no shelf 48 is provided.

Figure 5A:
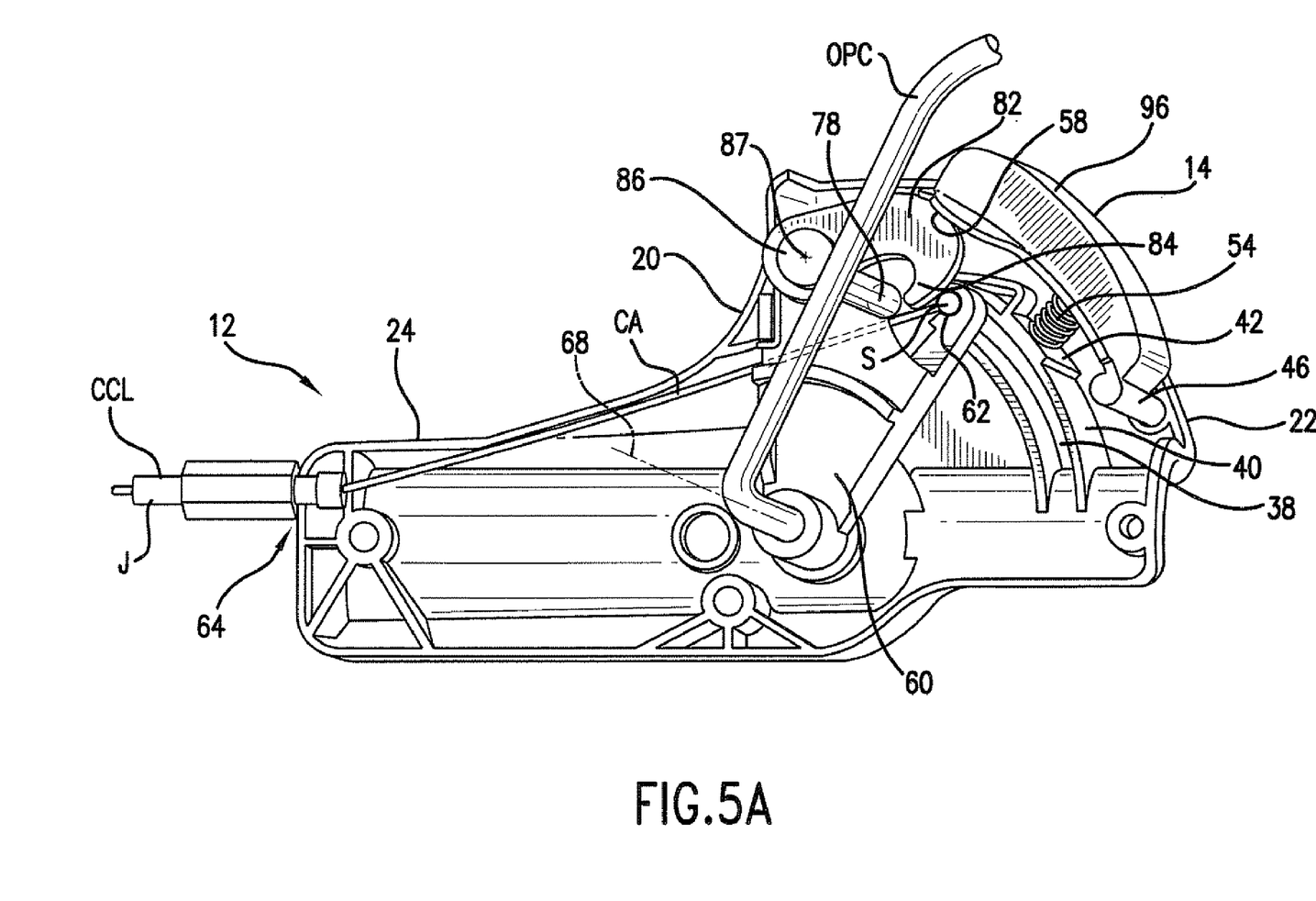
FIGS. 5A, 5B, and 5C illustrate partial cross-sectional views of the blade brake clutch control according to FIGS. 1 and 4 during operation of the blade brake clutch control.
Figure 5B:
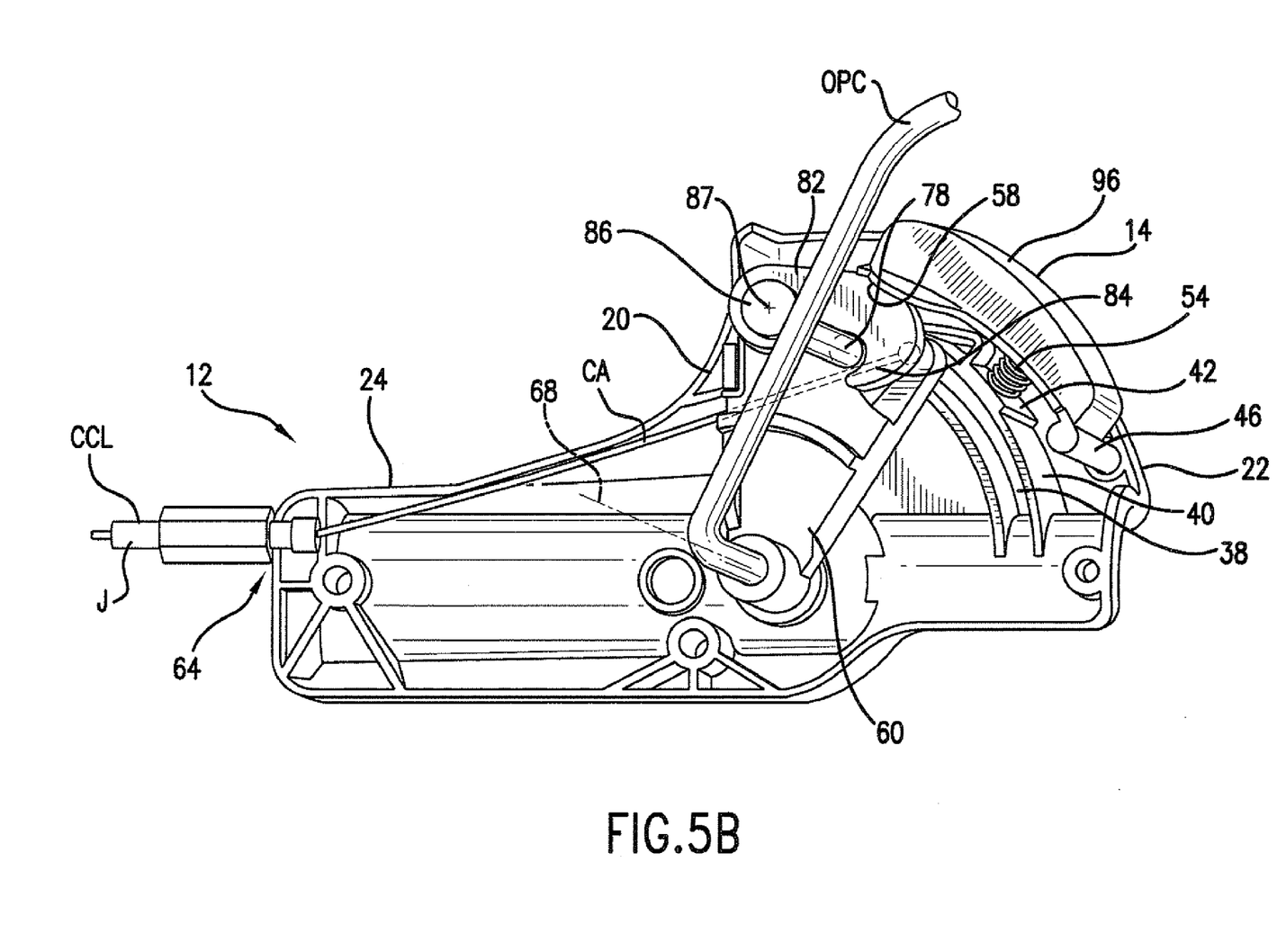
Figure 5C:
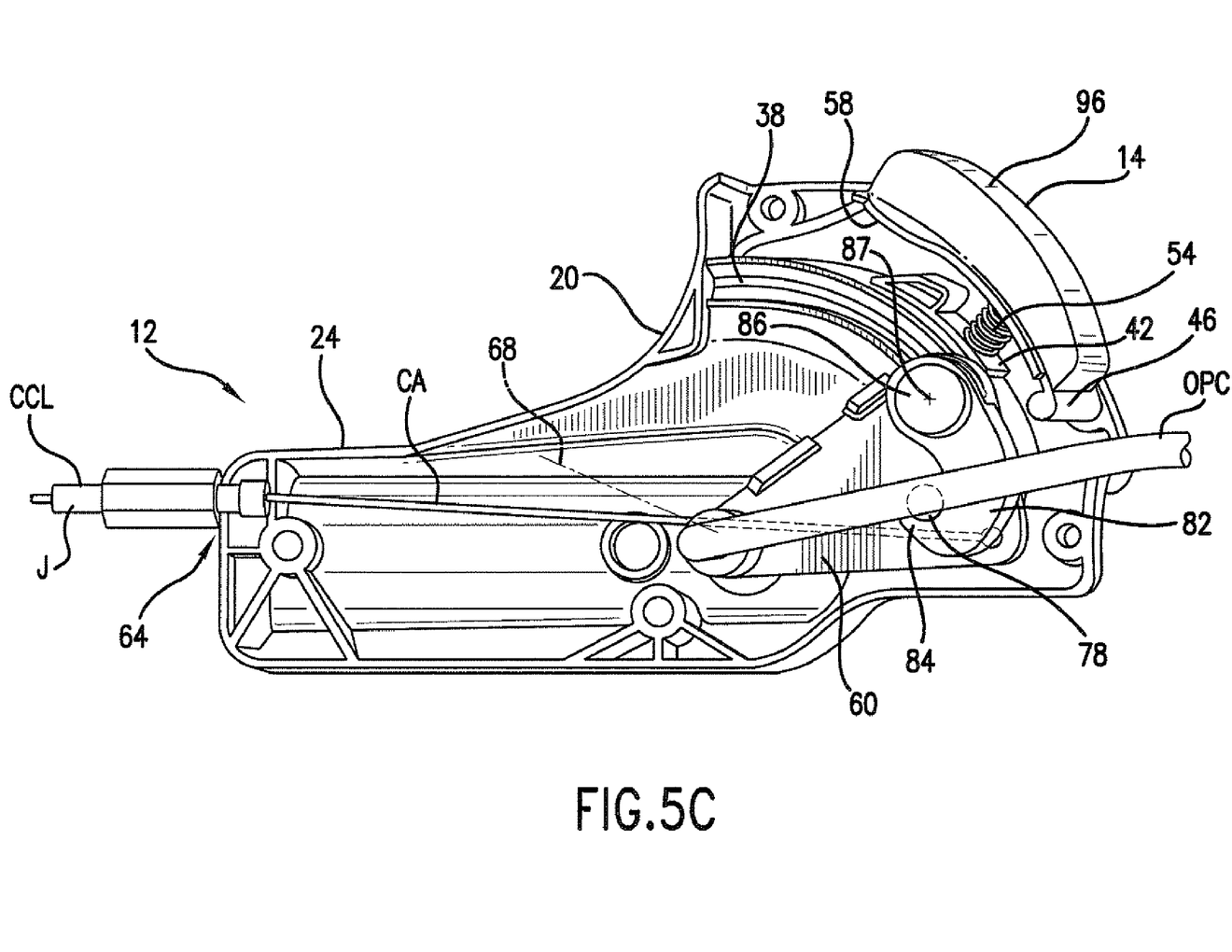

Brake clutch control apparatus 11 of blade brake clutch control 10 further can include a pivot arm 60 to which cable CA of clutch control line CCL can be secured. For example, pivot arm 60 can include a cable recess 62 in which a stop S of cable CA can be secured. The connection between cable CA and pivot arm 60 can be at different locations along pivot arm 60. Cable CA can pass through a cable aperture 64 in housing 12 with jacket J of clutch control line CCL secured at cable aperture 64 (as shown in FIGS. 5A-5C) to prevent moisture leakage into housing 12 therethrough. Pivot arm 60 can rotate about a pivot 66. Pivot 66 is centered on a pivot axis 68 around which pivot arm 60 rotates within housing 12. Pivot arm 60 can be secured at pivot 66 along pivot axis 68 in many different ways including through a pin, bolt, screw, or other securing device which allows rotation of pivot arm 60.

In the embodiment shown, operator presence control bail OPC can be used to secure pivot arm 60 through pivot 66 along pivot axis 68. Control bail OPC can extend between the two side arms SA as shown in FIG. 1. Control bail OPC is secured to each side arm at locations on each side arm SA that are aligned with each other to allow easy rotation toward cross bar CB of handle H. On the side on which housing 12 is secured, control bail OPC can include a pivot base 70 which can extend through an aperture 72 in housing half 26 and further extend through a pivot aperture 74 in pivot 66 along pivot axis 68. Pivot base 70 can then extend further through aperture 76 in housing half 24 and on through side arm SA of handle H. A carter pin, nut, or the like can be secured around the end of pivot base 70 to hold it in place while permitting a rotation of both pivot base 70 and control bail OPC. In this manner, control bail OPC and pivot arm 60 can share a pivot axis 68 so that they both rotate around the same pivot axis 68 during operation.

Control bail OPC can further include a pin 78 which extends through a bail groove 80 in housing half 26. Bail groove 80 can be an arcuate slot which extends along a rear portion 26B of housing half 26. Pin 78 can rotate along bail groove 80 as control bail OPC rotates around pivot axis 68 with pivot base 70.

Pivot arm 60 can have a latch 82 secured thereto. Latch 82 can have a latch head 84 that aligns with pin 78 of control bail OPC so that latch head 84 can hook around pin 78. In this manner, both latch 82 and pivot arm 60 are secured to control bail OPC when latch head 84 is hooked on pin 78. Thereby, when control bail OPC is pulled downward, pin 78 pulls latch 82 along with pivot arm 60 in the same direction as control bail OPC. As pivot arm 60 travels with control bail OPC, cable CA is pulled forward as pivot arm 60 rotates downward. This action of cable CA engages blade brake clutch BBC to activate the clutch and release the brake to permit blade B of lawnmower LM shown in FIG. 1 to rotate.

A pivot pin 86 extends through latch 82 and latch pivot aperture 88 in pivot arm 60 so as to extend into guidance groove 38 in housing half 24. Pivot pin 86 can be held in place in latch 82 and pivot arm 60 in any conventional manner that allows latch 82 to pivot about pivot pin 86. For example, a coffer pin, or beta pin, can be placed through an aperture in the pivot pin 86 with the coffer pin, or beta pin, riding on a surface of a washer through which pivot pin 86 passes on the other side of pivot arm 60 opposite latch 82. Guidance groove 38 can have an arcuate shape that can match the arcuate movement of bail OPC. In this manner, pivot arm 60 has an upper guidance with pivot pin 86 extending into guidance groove 38, which secures its movement and creates a sturdier brake clutch control apparatus 11.

A latch spring 90 can be used to bias latch 82 toward a disengaged position away from pin 78 so that an affirmative action by the operator must occur before latch 82 secures pivot arm 60 to control bail OPC before engagement of blade brake clutch BBC to permit the rotation of blade B. For example, latch spring 90 can be a leaf spring, coil spring, a Belleville spring, or some other resilient material which biases latch 82 toward a disengaged position. In the embodiment shown, latch spring 90 can be a coil spring which has an end 90A and an end 90B. End 90A can be secured within a notch 92 of pivot arm 60 while end 90B can be secured under a ledge 94 formed on latch 82. In this manner, latch spring 90 biases latch 82 to an upper position away from pin 78 of control bail OPC.

Contact surface 58 of button 14 aligns with a portion of latch 82 distal from pivot pin 86 so that, as button 14 is depressed, contact surface 58 contacts latch 82 and pushes latch head 84 into engagement around pin 78. Control bail OPC can then be pulled at this point thereby causing pivot arm 60 to rotate with control bail OPC. As pivot arm 60 rotates downward, cable CA is pulled forward to engage blade brake clutch BBC to permit rotation of blade B by engaging the clutch and releasing the brake of blade brake clutch BBC. This operation is explained in more detail in FIGS. 5A-5C.

FIGS. 5A-5C show the operation of blade brake clutch control 10 in a semi-cutaway view with the housing half 26 removed to more clearly show the operation of blade brake clutch control 10. In normal operation of lawnmower LM (shown in FIG. 1), control bail OPC resides in and is biased toward an upper position away from cross bar CB of handle H. If the operator starts engine E of lawnmower LM and does not depress rearward button 14 by pressing against user interface surface 96 thereon, then the pulling down of the operator presence control bail OPC will not result in the engaging of blade brake clutch BBC to permit the rotation of blade B. For example, if rearward button 14 is not depressed, latch 82 does not pivot into position where latch head 84 engages pin 78. Thus, when the operator pulls control bail OPC in the direction of arrow A toward cross bar CB (see FIG. 3) only the control bail OPC and pin 78 move downward within housing 12. Pivot arm 60 is not rotated about pivot axis 68 so that cable CA is pulled forward.

However, once the operator pushes against user interface surface 96 of rearward button 14, button spring 54 compresses as contact surface 58 contacts against latch head 84 so that latch 82 pivots around pivot point 87 within pivot pin 86.

Latch head 84 of latch 82 then engages pin 78 of bail OPC so that latch head 84 hooks around pin 78 as shown in FIG. 5B. When button 14 is pushed, the button pivots downward about pivot bar 46. Upon release of the button 14, button spring 54 biases button 14 back to its protruding position outside of housing 12 about pivot bar 46. At this point, control bail OPC can be pivoted about pivot axis 68 from its upper position toward cross bar CB of handle H. As control bail OPC rotates downward, pin 78, which is engaged and hooked by latch head 84 of latch 82, pulls latch 82 along with control bail OPC. Since latch 82 is secured to pivot arm 60, pivot arm 60 also rotates along pivot axis 68 as control bail OPC rotates toward cross bar CB. As pivot arm 60 rotates downward, cable CA within clutch control line CCL is pulled forward as shown in FIG. 5C. In this manner, cable CA causes blade brake clutch BBC to engage blade B so that blade B freely rotates.

Figure 6:
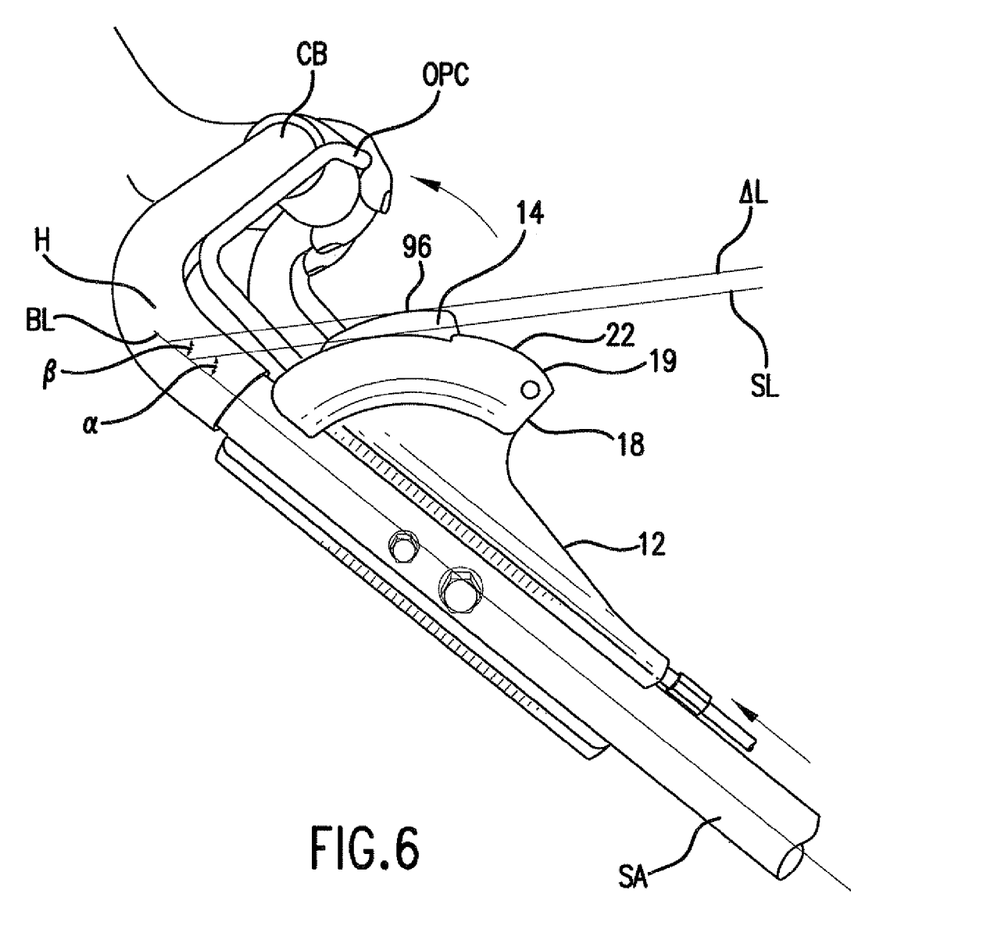
FIG. 6 illustrates a side view of the embodiment of the blade brake clutch control according to FIGS. 1 and 4 illustrating nominal angles of portions of the blade brake clutch control.

As described above, sloped rear side 22 of top portion 18 of housing 12 and rearward button 14 in brake clutch control apparatus 11 provide an ergonomic step in the two-step operator presence control of blade brake clutch control 10. The angles of sloped rear side 22 and rearward button 14 can contribute to easy and comfort of use for the operator. Referring to FIG. 6, housing 12 with top portion 18 extending above side arm SA of handle H forms a rear side 22 that slopes from a peak 19 downward toward handle H. The slope of rear side 22 can extend in a direction opposite to the direction at which side arms SA of handle H are angled downward to mower deck MD (see FIG. 1). In the embodiment shown, rear side 22 has a convex slope, however, the slope can be concave or straight. Rearward button 14 protrudes outward from rear side 22. Angled rearward button 14 can also extend in a direction opposite to the direction at which side arms SA of handle H are angled downward to mower deck MD (see FIG. 1).

As shown in FIG. 6, a nominal angle α for the slope of rear side 22 can be measured between a tangential line SL that passes through a central portion of rear side 22 that serves as an operation point from which rearward button 14 extends and a base line BL that is aligned with side arm SA of handle H. Similarly, a nominal angle β for rearward button 14 can be measured between a tangential line AL that passes through an operation point of a central portion of the user interface surface 96 and base line BL.

As stated above, the nominal angles α and β of the respective rear side 22 and rearward button 14 can vary. Nominal angle α for the slope of rear side 22 can be between about 15° and about 85°. Similarly, nominal angle β for rearward button 14 can be between about 15° and about 85°. The nominal angle β of rearward button 14 can depend on nominal angle α of the slope of rear side 22 of top portion 18 of housing 12. Nominal angle β of rearward button 14 can be substantially equal to nominal angle α of the slope of rear side 22. In the alternative, nominal angle β of rearward button 14 can be different from nominal angle α of the slope of rear side 22. For example, nominal angle β of rearward button 14 can be larger or smaller than nominal angle α of rear side 22.

In the above described manner, a more ergonomically acceptable blade brake clutch control can therefore be provided and used. Placement of the button on a sloped rear portion of the housing so that the button can be angled and provides easy accessibility and comfortable pushing for the operator. Such placement of the rearward button is more comfortable and easier for the operator to use when pulling downward on the operator presence control bail. This placement of the rearward button permits easy use while still providing a cognizant recognition of the operator that two steps are required in order to permit the blade to rotate for operation of the lawnmower.

Embodiments of the present disclosure shown in the drawings and described above are exemplary of numerous embodiments that can be made within the scope of the appending claims. It is contemplated that the configurations described herein can comprise numerous configurations other than those specifically disclosed. The scope of a patent issuing from this disclosure will be defined by these appending claims.

What is claimed is:

1. A blade brake clutch control disposed on a handle of a power machine, the blade brake clutch control comprising:
    a housing having a top portion, the top portion of the housing having a front side and a rear side, the housing further having a groove therein;
    a control bail having a pin extending therefrom, the pin extending into the groove in the housing;
    a pivot arm disposed within the housing and connected to a control cable;
    a rotatable latch secured to the pivot arm, the latch having a latch head that is aligned with the pin extending from the control bail;
    a button disposed on the rear side of the top portion of the housing, the button having a contact surface positioned above the latch head; and
    the button being configured for pushing downward so that the contact surface contacts the latch head to rotate the latch head into an engaged position about the pin of the control bail so that, as the control bail is pulled toward the handle, the pivot arm also pivots downward to pull the control cable forward.

2. The blade brake clutch control according to claim 1, in which the rear side of the top portion of the housing is sloped downward from a peak on the top portion toward the handle of the power machine.

3. The blade brake clutch control according to claim 2, in which the button is angled as measured from a side arm of the handle.

4. The blade brake clutch control according to claim 3, in which a nominal angle of the button as measured from a side arm of the handle and a nominal angle of the slope of the rear side of the top portion of the housing as measured from a side arm of the handle are about equal.

5. The blade brake clutch control according to claim 1, in which the control bail and the pivot arm have a common pivot axis.

6. The blade brake clutch control according to claim 1, in which the housing includes a guidance groove configured to provide an upper guidance for the pivot arm as the pivot arm rotates with the control bail.

7. The blade brake clutch control according to claim 1, in which the rotatable latch is biased towards a disengaged position away from the pin of the control bail.

8. The blade brake clutch control according to claim 1, in which the rearward button includes a pivot bar around which the rearward button is pivotable.

9. A blade brake clutch control disposed on a handle of a power machine, the blade brake clutch control comprising:
    a housing having a top portion of the housing, the top portion having a front side and a sloped rear side with the rear side sloping downward in a direction opposite of a direction in which the handle extends toward the power machine;
    a control bail disposed on the handle of the power machine and interfacing with the housing;
    a control cable configured to engage and disengage a blade brake clutch;
    an angled button disposed on the sloped rear side of the top portion of the housing, and
    the button being configured to be pushed downward to cause the control bail to engage the control cable so that, as the control bail is pulled toward the handle, the control cable is pulled forward.

10. The blade brake clutch control according to claim 9, in which the control bail includes a pin that extends into the housing.

11. The blade brake clutch control according to claim 10, further comprising a pivot arm disposed within the housing and connected to the control cable and a rotatable latch secured to the pivot arm with the latch having a latch head that is aligned with the pin extending from the control bail.

12. The blade brake clutch control according to claim 9, in which the rearward button is angled at a nominal angle as measured from a side arm of the handle.

13. The blade brake clutch control according to claim 12, in which the nominal angle of the rearward button and a nominal angle of the slope of the rear side of the top portion of the housing as measured from a side arm of the handle are about equal.

14. The blade brake clutch control according to claim 11, in which the control bail and the pivot arm have a common pivot axis.

15. A blade brake clutch control disposed on a handle of a power machine, the blade brake clutch control comprising:
    a housing having a top portion, the top portion of the housing having a front side and a sloped rear side;
    a control bail disposed on the handle of the power machine and interfacing with the housing, the control bail including a pin that extends into the housing;
    a control cable configured to engage and disengage a blade brake clutch;
    an angled button disposed on the sloped rear side of the top portion of the housing;
    a pivot arm disposed within the housing and connected to the control cable;
    a rotatable latch secured to the pivot arm with the latch having a latch head that is aligned with the pin extending from the control bail; and
    the rearward button having a contact surface positioned above the latch head, the contact surface being configured to contact the latch head upon depression of the button to rotate the latch head into an engaged position about the pin of the control bail so that, as the control bail is pulled downward, the pivot arm also pivots downward to pull the control cable forward.

* * * * *